United States Patent Office 3,651,036
Patented Mar. 21, 1972

3,651,036
STABLE ANAEROBIC CURABLE SEALING COMPOSITIONS CONTAINING ZINC CHLORIDE AND TETRAHYDROQUINOLINE
Eisuke Watanabe and Masayashi Ozono, Tokyo, Japan, assignors to Tokyo Three Bond Co., Ltd., Tokyo, Japan
No Drawing. Filed Feb. 16, 1970, Ser. No. 11,920
Int. Cl. C08f 3/64, 3/66
U.S. Cl. 260—89.5                              10 Claims

ABSTRACT OF THE DISCLOSURE

The present invention relates to an anaerobic curable sealing composition comprising 100 parts by weight of acrylic ester monomer containing polymerization initiator capable of imparting anaerobic property, 0.1 to 20 parts by weight of zinc chloride and 0.01 to 20 parts by weight of tetrahydroquinoline added thereto, which composition maintains preservation in the air and cures in extremely short periods of time under the condition of air-exclusion.

---

The present invention relates to an anaerobic curable sealing composition having a character such that it maintains a liquid state in the air while rapidly curing under the condition of air-exclusion which is suitable for use in locking parts to be screwed, retaining fitted parts and sealing liquid and gas under high pressure or temperature.

By the term of an anaerobic curable sealing composition hereinabove is meant a composition having a character such that it maintains a liquid state in the air while curing upon exclusion of air or oxygen, thereby causing a seal or adhesion in joints as a result of the immediate cure upon air-exclusion after coating said composition over the joints.

As such anaerobic curable sealing composition, compositions consisting of an acrylic acid type esters and several kinds of organic hydroperoxide are known. However, the known sealing compositions are not completely satisfactory because of a number of disadvantages in curing velocity, primary adhesive strength; and stability and thermal resistance during the storage thereof.

Various efforts have been made for the purpose of promoting curing velocity by means of adding organic amines, ascorbic acid, and the like as the third component to the mixtures of monomers capable of imparting anaerobic curable property with peroxides. It has been, however, difficult to provide a practicable sealing composition due to the difficulty of adjusting the relative relation between curing velocity and storage life.

It is, therefore, a primary object of the present invention to eliminate the above-mentioned disadvantages.

It is a further object of the present invention to obtain an anaerobic curable sealing composition having a character such that it is excellent in preserving liquid state in the air while beginning to cure in the course of an extremely short period of time, that is, 5 to 10 minutes, with complete cure achieved within the period of one to two hours.

The present invention contemplates to accomplish the aforementioned objects by providing an anaerobic curable sealing composition characterized by a high velocity in curing which comprises 100 parts by weight of acrylic ester monomers, containing polymerization initiator capable of imparting anaerobic property, 0.1 to 20 parts by weight of zinc chloride and 0.01 to 20 parts by weight of tetrahydroquinoline, respectively, added thereto.

The acrylic ester monomers, capable of imparting anaerobic property referred to hereinabove signifies such monomers that are capable of imparting anaerobic property where polymerization initiator, zinc chloride and tetrahydroquinoline are added to said monomers. These monomers include trimethylol propane tri-methacrylate, 2-hydroxyethyl methacrylate, tetraethylene glycol dimethacrylate, diethylene glycol dimethacrylate, triethylene glycol dimethacrylate, dipropylene glycol dimethacrylate, glycerin trimethacrylate, dimethacrylate bis (ethylene glycol) phthalate, propyethylene glycol dimethacrylate, di-(pentamethylene glycol) dimethacrylate, tetraethylene glycol di-(chloroacrylate), diglycerol diacrylate, diglycerol tetra-methacrylate, tetramethylene dimethacrylate, ethylene dimethacrylate, neopentyl glycol diacrylate, trimethylol propane triacrylate and the like.

Also, the polymerization initiators, used in the present invention are anaerobic polymerizing catalysts, and the preferred catalysts for this purpose are organic peroxides, which are generally known, such as, for example, hydroperoxide, methyl ethyl ketone peroxide, t-butyl perbenzoate and the like. It is preferred that in order to obtain good results in the present invention the addition amount of these peroxides be in the range of 0.1 to 10 parts by weight on the basis of 100 parts by weight of monomers.

Zinc chloride and tetrahydroquinoline used in the present invention serve to impart to the present invention characters of maintaining storage stability (preservation) in the air, that is, liquid state, as well as possessing rapid anaerobic curable property under the condition of air-exclusion.

Such anaerobic curable sealing compositions, characterized by maintaining a high stable storage and a great rapidness in anaerobic curability may be obtained only where both zinc chloride and tetrahydroquinoline compounds are added to the monomers, containing polymerization initiators. With the addition of only zinc chloride or tetrahydroquinoline, it is not possible to obtain said compositions.

Said composition having the characters described above may be obtained only where the content of zinc chloride ranges from 0.1 to 20 parts by weight and the content of tetrahydroquinoline ranges from 0.1 to 20 parts by weight, which content being based on 100 parts by weight of the monomer. With the content of these compounds deviated from said scope, it is not possible to obtain the rapid curable composition having stable storage.

In addition, zinc chloride may be added using the solution thereof dissolved in solvents such as water, alcohol, etc.

The tetrahydroquinolines which can be used in the present invention include 1,2,3,4-tetrahydroquinoline, 5,6, 7,8-tetrahydroquinoline, $B_z$-tetrahydroquinoline, $P_y$-tetrahydroquinoline and the like.

The present composition may also include polymerization inhibitors in order to obtain better results. These polymerization inhibitors may be the known materials with respect to vinyl compounds. By way of example, there are enumerated quinones, which are generally known, such as 4-benzoquinone, 2,5-dihydroxybenzoquinone, 2,5-diphenyl-P-benzoquinone, 1,2-naphthoquinone, 9,10-anthraquinone, and paramethoxy phenols.

The composition thus obtained is advantageous in that it maintains storage stability in the air, and under the condition of air-exclusion it begins to cure in an extremely short period of time, that is, 5 to 10 minutes, and accomplishes a complete curing between the period of 1 to 20 hours.

The examples according to the present invention are as follows.

EXAMPLE 1

Zinc chloride and 1,2,3,4-tetrahydroquinoline are added, in the quantities shown in Table 1, to 100 parts by weight of each of monomers containing 5 percent by weight of cumene hyperoxide. Each of the resulting compositions are coated on the grooves of a 10 mm. diameter nut and bolt which are then engaged. After leaving this in the air at room temperature for the predetermined times listed, the return torque, a measure of curing velocity, was determined. Preservation stability was also determined by noting gel formation after 30 minutes at 80° C.

The results reported in Table 1, show the rapid curing of the polymeric composition in the absence of air and the shelf stability of the composition.

TABLE 1

| Monomers [1] | Zinc chloride (percent by weight) | 1,2,3,4,-tetra- hydroquino- line (percent by weight) | Stability | Return torque (kg.-cm.) after— | | |
|---|---|---|---|---|---|---|
| | | | | 5 min. | 10 min. | 15 min. |
| Tetra-ethylene glycol dimethacrylate | 2 | 0.1 | No gelation | 10-30 | 50-100 | 200-250 |
| Diethylene glycol dimethacrylate | 2 | 0.1 | do | 10-30 | 50-100 | 150-200 |
| Triethylene glycol dimethacrylate | 2 | 0.1 | do | 10-30 | 50-100 | 200-250 |
| 1,2-propylene glycol dimethacrylate | 2 | 0.1 | do | 10-30 | 50-100 | 250-300 |
| Trimethylol propane trimethacrylate | 2 | 0.1 | do | 10-30 | 50-100 | 200-250 |
| Glycerin trimethacrylate | 2 | 0.1 | do | 10-30 | 50-100 | 150-200 |
| 2-hydroxyethyl methacrylate | 4 | 0.1 | do | 10-30 | 50-100 | 300-350 |
| Dimethacrylate bis(ethylene glycol) phthalate | 2 | 0.1 | do | 10-30 | 50-100 | 150-200 |

[1] Contain 5% by weight of cumenehydroperoxide.

EXAMPLE 2

To 100 parts by weight of tetraethylene glycol dimethacrylate are added 5 parts by weight of cumen hydroperoxide and 2 parts by weight of zinc chloride. The resulting composition is divided into four aliquots to which different tetrahydroquinolines are added. The compositions weer then evaluated by tests described above in Example 1. The results are shown in Table 2.

TABLE 2

| Tetrahydroquinolines | Amounts (percent by weight) | Stability | Return torque (kg.-cm.) after— | | |
|---|---|---|---|---|---|
| | | | 5 min. | 10 min. | 15 min. |
| 1,2,3,4-tetrahydroquinoline | 0.1 | No gelation | 10-30 | 50-100 | 200-250 |
| 5,6,7,8-tetrahydroquinoline | 0.1 | do | 10-30 | 50-100 | 200-250 |
| $B_z$-tetrahydroquinoline | 0.1 | do | 10-30 | 50-100 | 200-250 |
| $P_y$-tetrahydroquinoline | 0.1 | do | 10-30 | 50-100 | 200-250 |

These data show that different isomers of tetrahydroquinolines as well as substituted tetrahydroquinolines may be used in the present invention.

EXAMPLE 3

The tests on stability and curing velocity were carried out on compositions in which zinc chloride alone was added to 100 parts by weight of each of the monomers described in Example 1. The test procedures used in Example 1 were followed. The results are shown in Table 3.

TABLE 3

| Monomers [1] | Zinc chloride (percent by weight) | Stability | Return torque (kg.-cm.) after— | | |
|---|---|---|---|---|---|
| | | | 5 min. | 10 min. | 15 min. |
| Tetra-ethylene glycol dimethacrylate | 2 | No gelation | 0 | 0-5 | 10-20 |
| Diethylene glycol dimethacrylate | 2 | do | 0 | 0-5 | 15-20 |
| Triethylene glycol dimethacrylate | 2 | do | 0 | 0-5 | 5-10 |
| 1,2-propylene glycol dimethacrylate | 2 | do | 0 | 0-5 | 5-10 |
| Trimethylol propane trimethacrylate | 2 | do | 0-5 | 5-10 | 10-20 |
| Glycerin trimethacrylate | 2 | do | 0 | 0-5 | 5-10 |
| 2-hydroxyethyl methacrylate | 4 | do | 0 | 0-5 | 20-30 |
| Dimethacrylate bis (ethylene glycol) phthalate | 2 | do | 0 | 0-5 | 5-10 |

[1] Contain 5% by weight of cumene hydroperoxide.

These data show that where zinc chloride alone is added, the resulting compositions do not have the rapid curing property of the compositions of the present invention.

EXAMPLE 4

The tests on stability and curing velocity were carried out on compositions in which 1,2,3,4 - tetrahydroquinoline alone was added to 100 parts by weight of the monomers described in Example 1. The test procedure used in Example 1 was followed. The results are shown in Table 4.

TABLE 4

| Monomers | 1,2,3,4-tetra- hydro- quinoline (percent by weight) | Stability | Return torque (kg.-cm.) after— | | |
|---|---|---|---|---|---|
| | | | 5 min. | 10 min. | 15 min. |
| Tetra-ethylene glycol dimethacrylate | 0.5 | No gelation | 0 | 0 | 0 |
| Diethylene glycol dimethacrylate | 0.5 | do | 0 | 0 | 0 |
| Triethylene glycol dimethacrylate | 0.5 | do | 0 | 0 | 0 |
| 1,2-propylene glycol dimethacrylate | 0.5 | do | 0 | 0 | 0 |
| Trimethylol propane trimethacrylate | 0.5 | do | 0 | 0 | 0 |
| Glycerin trimethacrylate | 0.5 | do | 0 | 0 | 0 |
| 2-hydroxyethyl methacrylate | 0.5 | do | 0 | 0 | 0 |
| Dimethacrylate bis (ethylene glycol) phthalate | 0.5 | do | 0 | 0 | 0 |

What is claimed is:

1. An anaerobic curable sealing composition consisting essentially of an anaerobic curable polyol acrylic ester monomer, an organic peroxide polymerization initiator capable of initiating the anaerobic curing, zinc chloride and tetrahydroquinoline, said composition comprising 100 parts by weight of the polyol acrylic ester monomer; from 0.1 to 10 parts by weight of the peroxide polymerization initiator, from 0.1 to 20 parts by weight of zinc chloride and from 0.01 to 20 parts by weight of the tetrahydroquinoline.

2. The composition of claim 1 wherein tetraethylene glycol dimethacrylate is the acrylic ester monomer.

3. The composition of claim 1 wherein diethylene glycol dimethacrylate is the acrylic ester monomer.

4. The composition of claim 1 where triethylene glycol dimethacrylate is the acrylic ester monomer.

5. The composition of claim 1 wherein 1,2 - propylene glycol dimethacrylate is the acrylic ester monomer.

6. An anaerobic curable sealing composition as defined in claim 1 wherein the polymerization initiator is cumene hydroperoxide.

7. An anaerobic curable sealing composition as defined in claim 1 wherein the tetrahydroquinoline is 1,2,3,4-tetrahydroquinoline.

8. An anaerobic curable sealing composition as defined in claim 7 wherein the tetrahydroquinoline is 5,6,7,8-tetrahydroquinoline.

9. An anaerobic curable sealing composition as defined in claim 7 wherein the tetrahydroquinoline is benzene tetrahydroquinoline.

10. An anaerobic curable sealing composition as defined in claim 7 wherein the tetrahydroquinoline is pyridine tetrahydroquinoline.

References Cited

UNITED STATES PATENTS

| | | | |
|---|---|---|---|
| 3,435,012 | 3/1969 | Nordlander | 260—89.5 R |
| 3,547,851 | 12/1970 | Frauenglass | 260—89.5 R |
| 3,525,726 | 8/1970 | Galinke et al. | 260—89.5 R |
| 3,419,512 | 12/1968 | Lees et al. | 260—89.5 R |
| 3,218,305 | 11/1965 | Krieble | 260—89.5 R |
| 3,454,543 | 7/1969 | Rai et al. | 260—89.5 R |
| 3,491,076 | 1/1970 | Bachman | 260—89.5 R |

HARRY WONG, Jr., Primary Examiner

U.S. Cl. X.R.

117—128.4; 260—78.4